United States Patent
Tu et al.

(10) Patent No.: US 7,743,466 B2
(45) Date of Patent: Jun. 29, 2010

(54) LABOR-SAVING PIVOTAL SHAFT STRUCTURE

(75) Inventors: Chung-Ho Tu, Sinjhuang (TW); Chia-Cheng Chen, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 892 days.

(21) Appl. No.: 11/545,375

(22) Filed: Oct. 10, 2006

(65) Prior Publication Data

US 2007/0163373 A1     Jul. 19, 2007

(30) Foreign Application Priority Data

Jan. 6, 2006    (TW) .............................. 95200318 U

(51) Int. Cl.
     *E05F 1/08*      (2006.01)
(52) U.S. Cl. ....................... 16/308; 16/321; 361/679.27
(58) Field of Classification Search .................. 16/308, 16/298–300, 321–322, 342, 277, 273, 335; 361/679.27; 379/433.13; 455/575.3; 248/920–923; 74/409
See application file for complete search history.

(56) References Cited

U.S. PATENT DOCUMENTS

| | | | | |
|---|---|---|---|---|
| 5,190,391 A | * | 3/1993 | Huong | ........................ 403/96 |
| 5,533,234 A | * | 7/1996 | Bizek | ........................... 16/308 |
| 5,771,540 A | * | 6/1998 | Carpenter et al. | ............. 16/308 |
| 5,787,549 A | * | 8/1998 | Soderlund | ..................... 16/308 |
| 6,510,588 B2 | * | 1/2003 | Eromaki | ...................... 16/308 |
| 6,648,398 B2 | * | 11/2003 | Duffy | .................... 296/146.11 |

* cited by examiner

*Primary Examiner*—William L. Miller
(74) *Attorney, Agent, or Firm*—Guice Patents PLLC

(57) ABSTRACT

The present invention discloses a labor-saving pivotal shaft structure, comprising a fixed part and a movable part, wherein the movable part and the fixed part produce a frictional torque therebetween to provide the movable part with the functions of rotating, arresting, and positioning relative to the fixed part; and a torsion rod which is a rigid rod, whose one end is mounted onto the fixed part; such that the fixed part is connected to a main frame and the movable part as well as the other end of the torsion rod are respectively connected to a cover frame, and thus when the cover frame is being closed down, the fixed part is in a fixed condition and the torsion rod and the cover frame rotate together, leading to the torsion rod being in a twisted condition of storing energy; whereas when the cover frame is being opened up, the stored energy of the torsion rod is released to provide an auxiliary force.

6 Claims, 6 Drawing Sheets

LABOR-SAVING PIVOTAL SHAFT STRUCTURE

FIELD OF THE INVENTION

The present invention relates to a pivotal shaft structure, and more particular, the present invention relates to a labor-saving pivotal shaft structure in which a torsion rod is used for storing and releasing energy to provide an auxiliary force.

BACKGROUND OF THE INVENTION

Consumer electronics with flip covers, such as portable computer, electronic dictionary, portable audio/video player, flip mobile phone, generally have a main body on the bottom, which is pivotally connected with the cover body on the top, such that the cover body may swing open or close with respect to the main body. Consequently, the rotating shaft is key to the quality of the products described above. In fact, the design for a good rotating shaft shall not only demand a necessary arresting effect to prevent loose joint after repetitive operations, but also prevent abnormal sound from occurring to annoy users.

Take the in-line axial friction pivotal shaft for example; the U.S. Pat. No. 5,190,391 (corresponding to ROC Patent 73784) held by the present inventor is the most prominent example. The advantage of the axial friction lies in that packing may be adjusted to press against the elastic body and in turn to change frictional torque, avoiding the loosening effect caused by repetitive operation. However, the frictional torque remains unchanged during the rotation of the pivotal shaft. For example, the opening up of the cover (the display panel) of a notebook computer often poses a difficulty for females or children. Consequently, it is necessary to design a pivotal shaft providing an auxiliary force without scarifying the arresting and locating functions.

SUMMARY OF THE INVENTION

With long time experience in designing, production, and marketing of pivotal shaft, the applicant proposes the present "Labor-saving Pivotal Shaft Structure" after numerous experiments and testings in order to overcome aforementioned drawbacks of conventional prior art.

An object of the present invention is to provide a labor-saving pivotal shaft structure, comprising a fixed part and a movable part, wherein the movable part and the fixed part produce a frictional torque therebetween to provide the movable part with the functions of rotating, arresting, and positioning relative to the fixed part; and a torsion rod which is a rigid rod, whose one end is mounted onto the fixed part; such that the fixed part is connected to a main frame and the movable part as well as the other end of the torsion rod are respectively connected to a cover frame, and thus when the cover frame is being closed down, the fixed part is in a fixed condition and the torsion rod and the cover frame rotate together, leading to the torsion rod being in a twisted condition of storing energy; whereas when the cover frame is being opened up, the stored energy of the torsion rod is released to provide an auxiliary force.

Another object of the present invention is to provide a labor-saving pivotal shaft structure, wherein the fixed part is a shaft, having an axle extending from one end axially, a linking portion disposed on the end of the axle connecting to the main frame, and a connecting portion disposed on the other end of the shaft and radially machined to have an indented shaft slot to accommodate the snappingly engaged portion disposed on one end of the torsion rod, which is further securingly retained on the connecting portion with a retaining strip mounted onto a shaft neck extending axially from the shaft slot; the movable part is tubular body, having a sleeve, a jointing portion disposed at an appropriate position to be mounted onto the cover frame, a hollow shaft sleeve securingly connecting the sleeve axially, and a collar disposed in the shaft sleeve to socketedly connect with the axle.

Yet another object of the present invention is to provide a labor-saving pivotal shaft structure, wherein the fixed part is a shaft, having an axle extending from one end axially, a connecting segment in the middle of the axle, a linking portion disposed on one end of the fixed part to connect to the main frame, and a connecting portion disposed on the other end of fixed part, wherein the connecting portion is radially machined to have an indented shaft slot to accommodate the snappingly engaged portion disposed on one end of the torsion rod, which is further securingly retained on the connecting portion with a retaining strip mounted onto a shaft neck extending axially from the shaft slot; the movable part is tubular body, having a sleeve, a jointing portion disposed at an appropriate position to be mounted onto the cover frame, at least a wear resistant strip and a frictional strip attached on each side of the jointing portion, and at least an elastic body attached at the external side of the jointing portion, such that when the axle passes through therein, an end cap is provided to connect the wear resistant strip, frictional strip, and elastic body onto the connecting segment.

Still yet another object of the present invention is to provide a labor-saving pivotal shaft structure, wherein the linking portion disposed with a fitting tenon is fitting inserted into the fitting hole of the main frame and is mounted into the fitting hole by a plurality of engrossings on its surface.

Still another object of the present invention is to provide a labor-saving pivotal shaft structure, wherein a snappingly engaged portion on one end of the torsion rod is mounted in the connecting portion and a retaining portion on the other end is retained onto the retaining hole of the cover frame; furthermore, the torsion rod is received in the rod recess predisposed in the cover frame and a plurality of press tenon protruding from one side on the top of the cover frame are used to restrict the torsion rod and to prevent it from coming out of the rod recess.

BRIEF DESCRIPTION OF THE DRAWINGS

The present invention can be more fully understood by reference to the following description and accompanying drawings, in which.

DETAILED DESCRIPTION OF THE INVENTION

Figure 1:
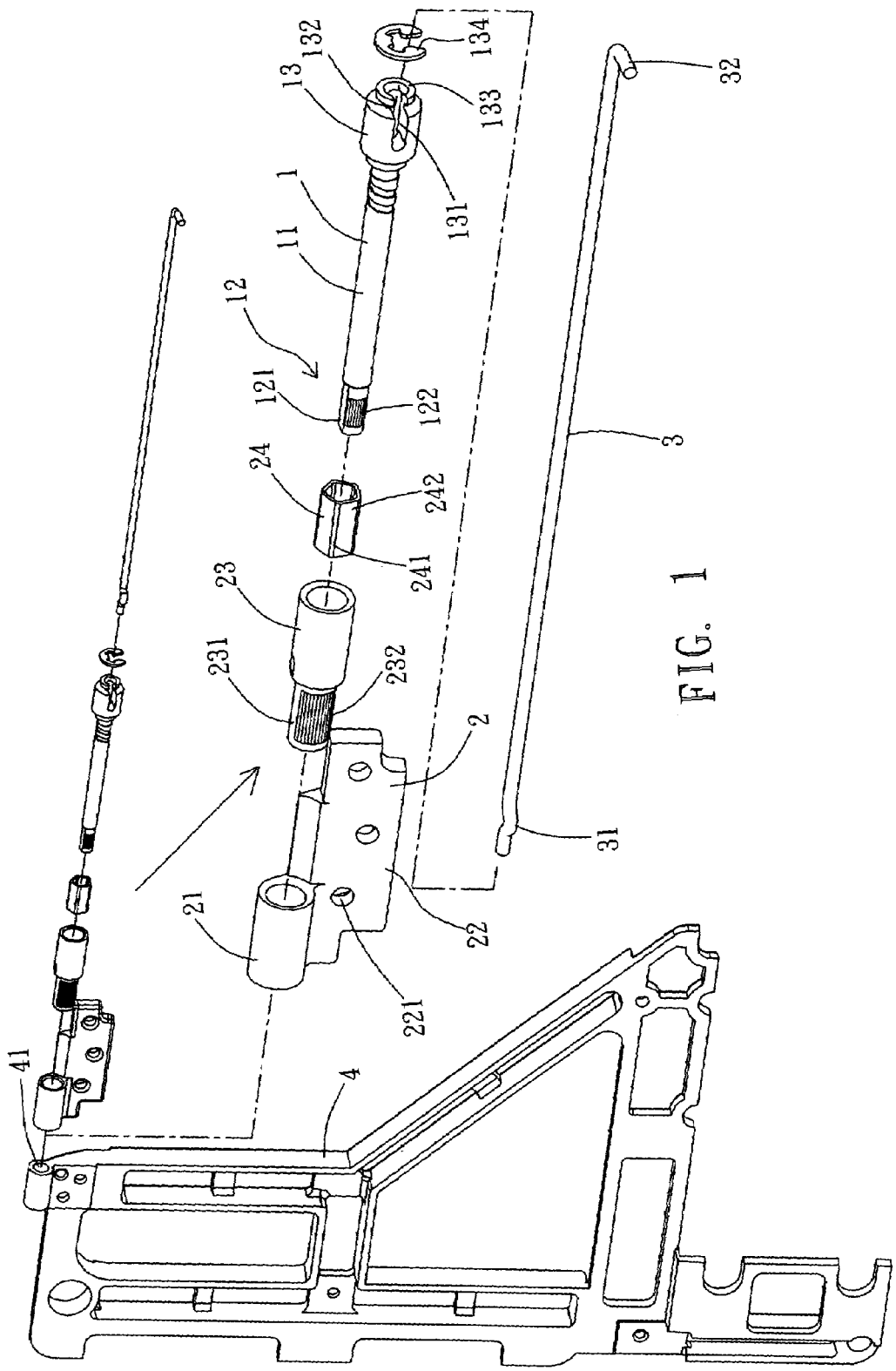
FIG. 1 schematically illustrates the exploded perspective view of the pivotal shaft structure according to the present invention.
Figure 2:
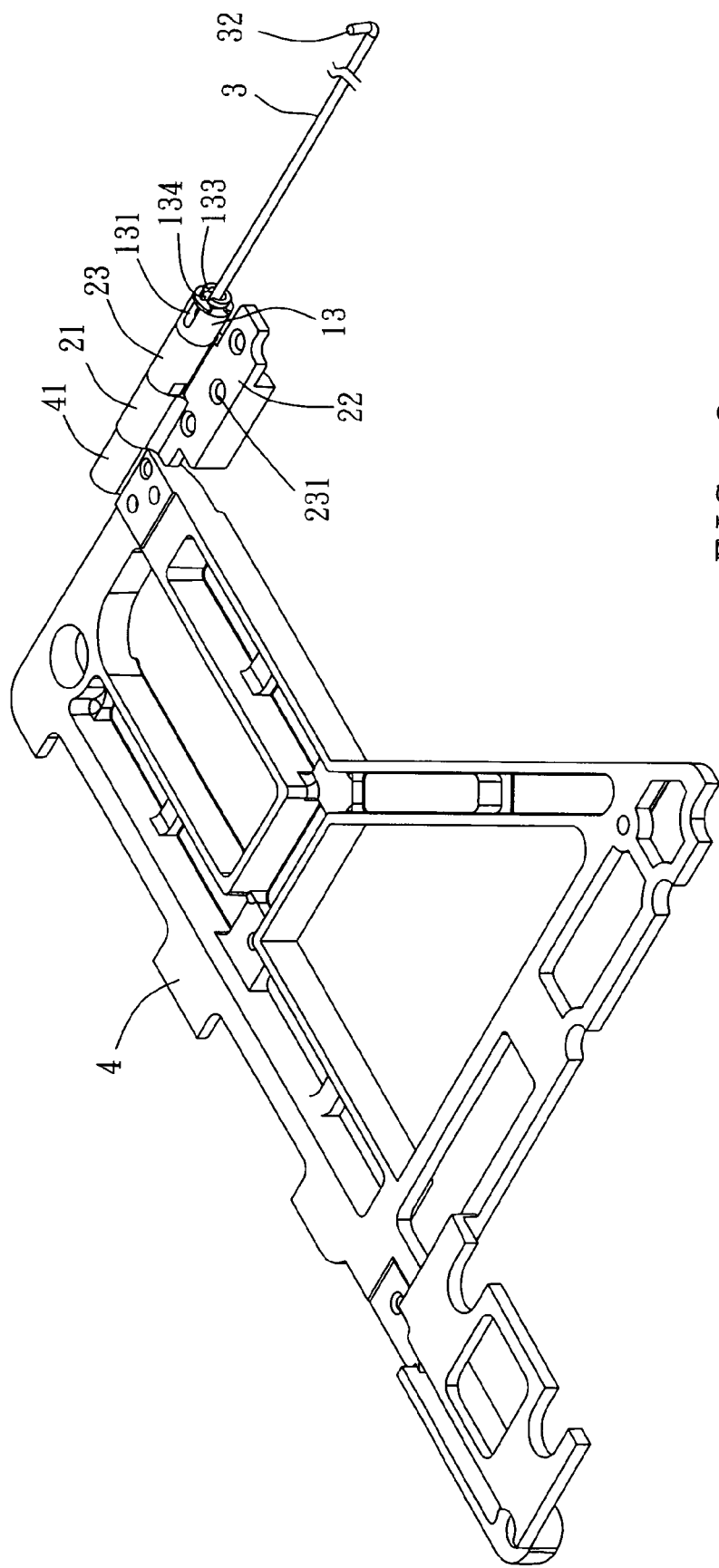
FIG. 2 schematically illustrates the exploded perspective view of the pivotal shaft structure according to the present invention and the main frame.
Figure 3:
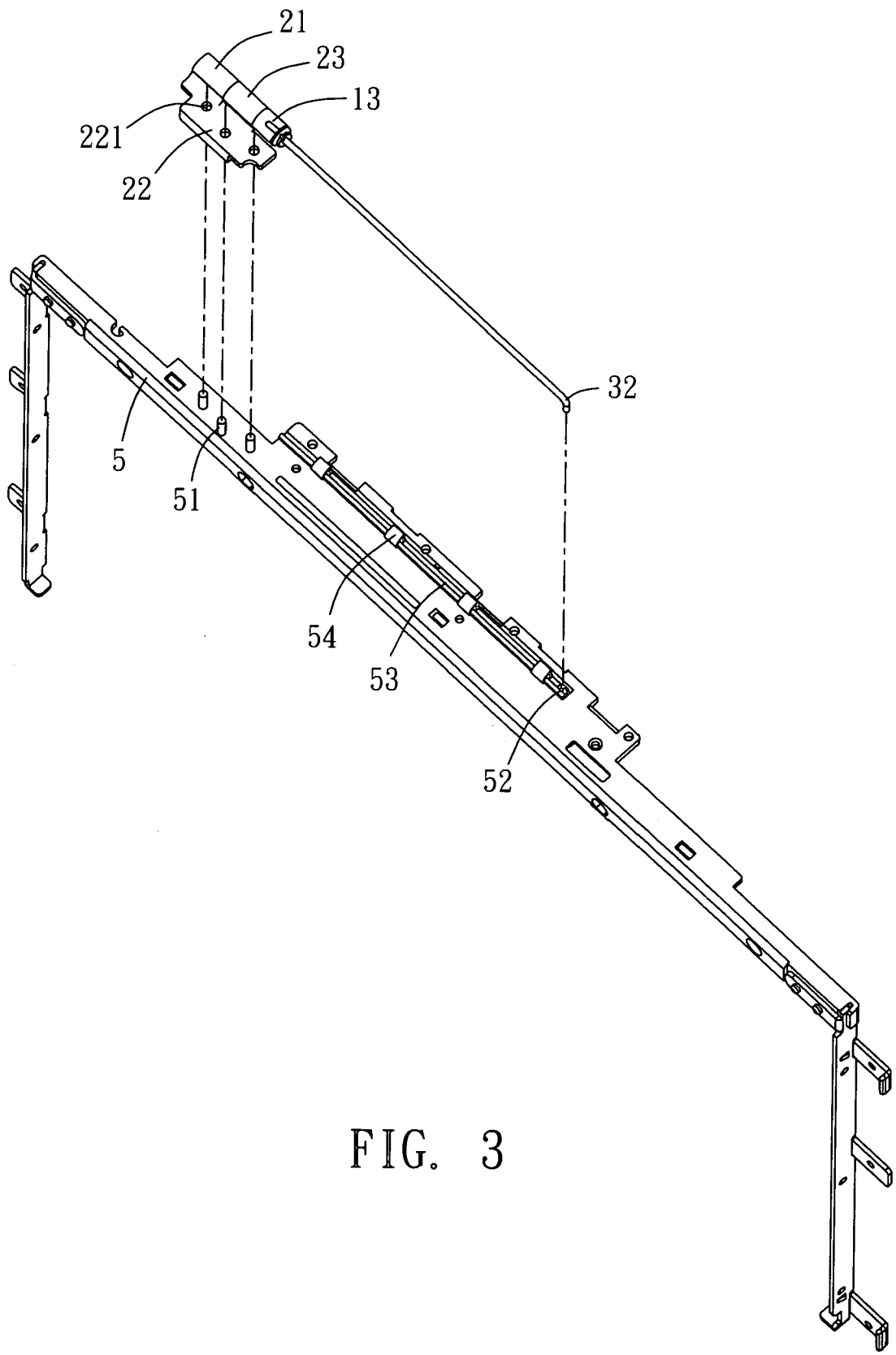
FIG. 3 schematically illustrates the exploded perspective view of the pivotal shaft structure according to the present invention and the cover frame.

As shown in FIGS. 1 to 3, a labor-saving pivotal shaft structure according to the present invention comprises a fixed part 1, a movable part 2, and a torsion rod 3.

Figure 4:
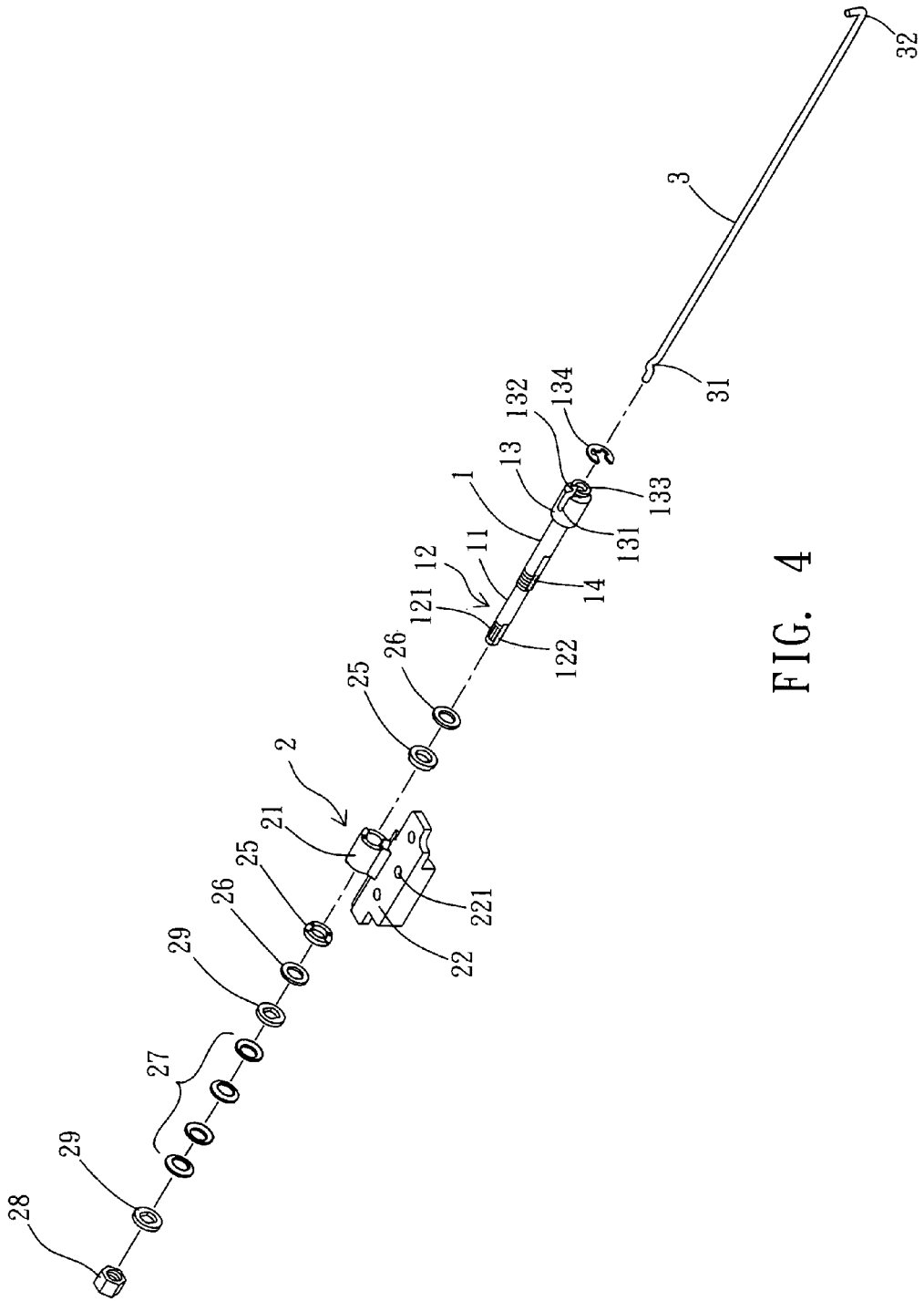
FIG. 4 schematically illustrates the exploded perspective view of another embodiment of the pivotal shaft structure according to the present invention.

The fixed part 1 is a shaft with one end extending to form an axle 11 which is connected to the movable part 2 and which is disposed with a linking portion 12 to be mounted on the main frame 4 shown in FIG. 4.

The linking portion 12 is connected to an object, the main frame 4 of the main body for example as shown in FIG. 1, by, for example but not limited to, a fitting tenon 121; other means of connection such as screwing or retaining are also within the scope of the present invention. In fact, the fitting tenon 121 of the linking portion 12 is connected to the fitting hole 41 of the main frame 4, wherein a plurality of engrossing 124 disposed on the surface is used to mount the linking portion 12 in the fitting hole 41. A connecting portion 13 disposed on the other end of the shaft 1 has a radially indented shaft slot 131 and an axially extending shaft neck 132 which is protrudingly disposed with a stop ring 133 and on whose edge a retaining strip 134 is attached to prevent the torsion rod 3 and described later from coming off the connecting portion 13.

The movable part 2 is tubular body, having a sleeve 21 for the passing of the axle 11 to generate a frictional torque therebetween, which is conventional art and will not be discussed furthermore. As shown in FIG. 3, a jointing portion 22 is formed by, radially for example, extending at an appropriate position of the sleeve 21 to be mounted onto an object, the cover body for example. The jointing portion 22 is machined to formed at least a jointing hole 221 which may be securingly riveted onto protruding rods 51 predisposed on the cover frame 4 of the cover body by conventional connecting means, as shown in FIG. 3. However, the connection between the jointing portion 22 and the cover body is not limited to the aforementioned method; other connecting means, such as screwing or retaining, are also within the scope of the present invention.

The distinct feature of the sleeve 21 according to the present lies in that it is axially mounted onto a hollow shaft sleeve 23, which extends toward the sleeve 21 to form a sleeve tenon 231 to mount onto one end of the sleeve 21 by a plurality of engrossings 232 on its surface and which is socketingly connected with a collar 24, an integrally-formed multi-folding elastic body ring comprising alternating raised portions 241 and contact faces 242. As shown in the figures, the collar 24 is, for example but not limited to, a hexagonal shape. Consequently, when the collar 24 is socketingly connected with the axle 11, some of the contact faces 242 may wrap the axle 11, thereby forming an intimate contact therebetween, and thus generate a torque.

A torsion rod 3 is a rigid rod, whose one end is connected to the fixed part 1 and whose other end is pivotally connected to a cover frame 5 capable of rotating open or close. When the cover frame 5 is rotating, the fixed part 1 is in a fixed condition and the torsion rod 3 and the cover frame 5 rotate together, leading to the torsion rod 1 being in a twisted condition of storing energy. As shown in the figures, one end of the torsion rod 3 is disposed with a snappingly engaged portion 31, which is fittingly inserted into the shaft 131 and then retained onto the shaft neck 132 with a retaining strip 134, so as to securingly mount the snappingly engaged portion 31 on the connecting portion 13; the other end of the torsion rod 3 is disposed with a retaining portion 32 to be retained onto the fitting hole 52 of the cover frame 5. A shown in FIG. 3, the torsion 3 is received in a predisposed shaft recess 53 and restricted by a plurality of press tenon 54 protruding from one side on the top of the cover frame 5, preventing the torsion rod 3 from coming out of the rod recess 51 when rotating to store energy.

Referring to FIG. 1, a socketingly-connected radial friction pivotal shaft structure is shown. FIG. 4 discloses an in-line axial friction pivotal shaft, comprising a fixed part 1, a movable part 2, and a torsion rod 3.

The difference between the fixed part 1 and the aforementioned embodiment lies in that the middle of the axle 11 is provided with a connecting segment 14, a screw segment for example; the movable part 2 comprises the same sleeve 21, which is inserted through by the axle 11, and the jointing portion 22. To increase friction and enhance service life, both ends of the sleeve 21 are installed with a wear resistant strip 25 and a friction strip 26, respectively. At least an elastic body 27 is installed on the external side of the sleeve 21, and an end cap 28, self-locking nut for example, is connected to the connecting segment 14 of the axle 11 after the axle 11 is being inserted into the sleeve 21. Consequently, the frictional torque is formed on the friction strip 26 between the connecting portion 13 and the sleeve 21 as well as the friction strip 26 between the sleeve 21 and the elastic body 27.

When the present invention being operated, the elastic body 27 is, for example but not limited to, a belleville washer; it may be a wave washer or spring, which may achieve the same function. Also, both sides of the elastic body 27 are disposed with a gasket 29, respectively.

Figure 5:
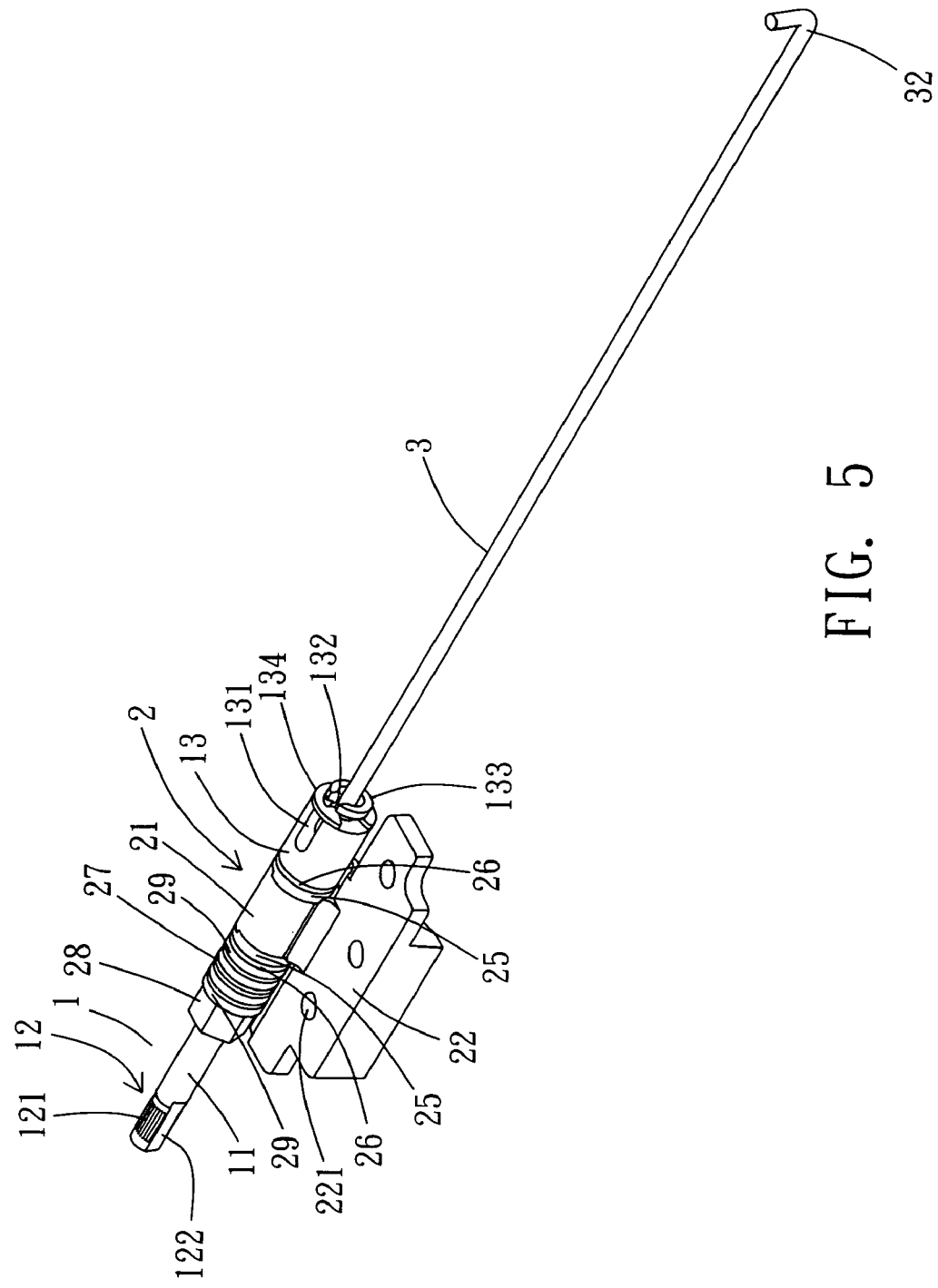
FIG. 5 schematically illustrates the perspective assembly view of another embodiment of the pivotal shaft structure according to the present invention.

The perspective assembly view of the in-line pivotal shaft is shown in FIG. 5; the linking portion 12 and the jointing portion 22 are connected with the main frame 4 and the cover frame 5 as in aforementioned embodiment, respectively, which will no be described furthermore.

Figure 6:
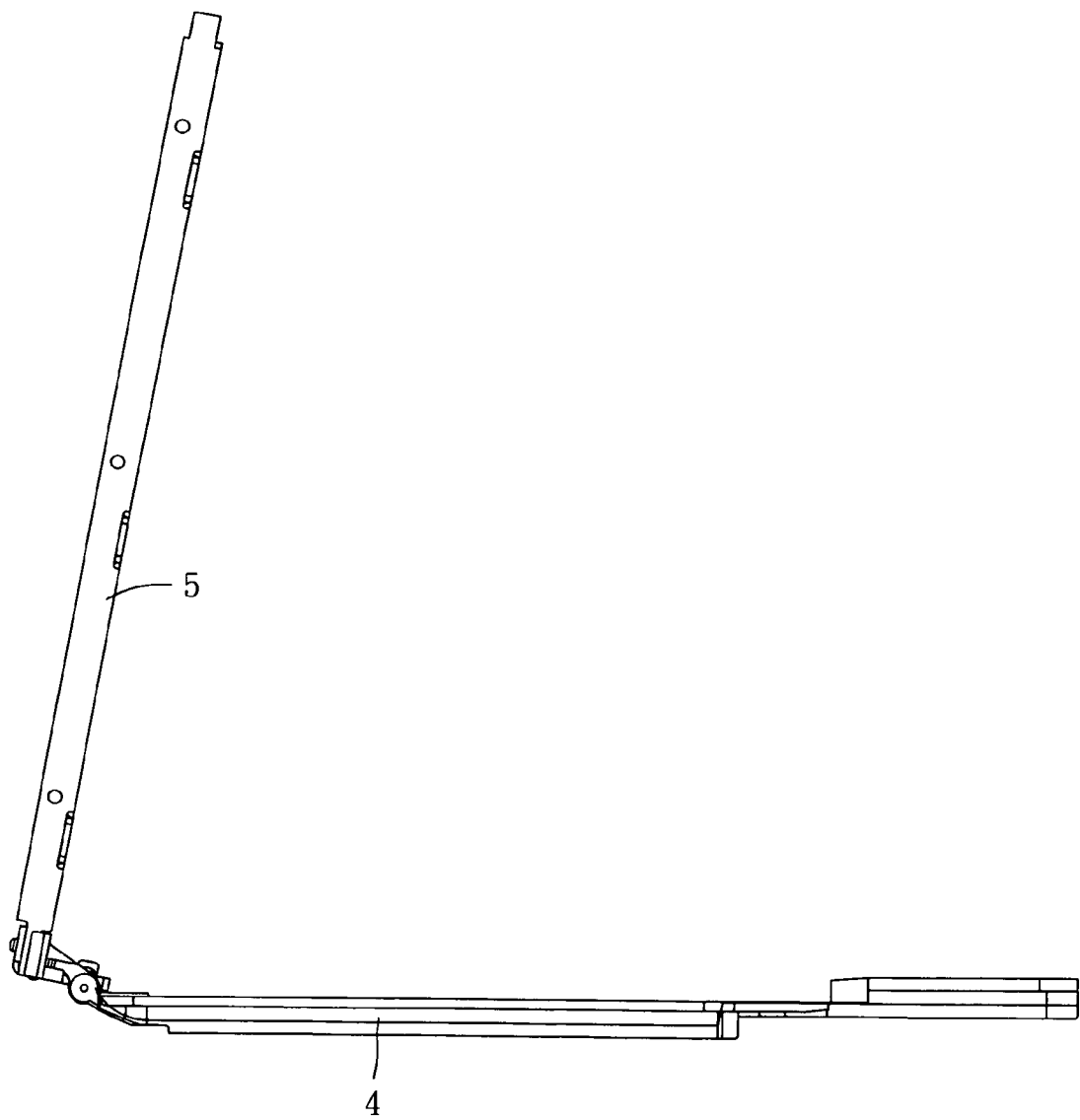
FIG. 6 schematically illustrates the side view of the pivotal shaft structure according to the present invention installed onto the main body and the cover body.

During the assembly process, the fixed part 1 is connected to the main frame 4 of the main body and the movable part 2 is connected to the cover frame 5 of the main body, and the retaining portion 32 of the torsion rod 3 is retained onto the cover frame 5. Referring to FIG. 6, the cover frame 5 is opened to a position about 80 degrees relative to the main frame 4 and, at this position the torsion rod 3 is not in the state of storing or releasing energy. When the cover body is being closed downward, the movable part 2 rotates along with the cover body, the torsion rob 3 retained on the fixed part 1 and the cover frame 5 starts to store torsional energy resulted from the rotation of the cover frame 5; the torsion rod 3 stores energy until the cover body is closed down onto the main body. When the cover body is being opened up, the torsion rod 3 will release energy to provide an auxiliary force for the cover frame 5, so as to achieve the labor-saving function.

Consequently, the implementation of the present invention can overcome the shortcoming of the conventional pivotal shaft, the torsional force remaining unchanged during the opening process of the cover body. Furthermore, the storing and releasing of energy is achieved by a single torsion rod, such that the torsion rod releases energy to provide an auxiliary force; therefore, even female or children can lift open the cover body with ease. Also, the torsion rod is in the state of storing energy when the cover being closed down, which may be easily achieved by the self-weight of the cover body (including liquid crystal panel).

While the invention has been described with reference to the a preferred embodiment thereof, it is to be understood that modifications or variations may be easily made without departing from the spirit of this invention, which is defined by the appended claims.

What is claimed is:

1. A labor-saving pivotal shaft structure comprising:
a fixed part and a movable part, wherein the movable part and the fixed part produce a frictional torque therebetween to provide the movable part with the functions of rotating, arresting, and positioning relative to the fixed part; and
a torsion rod which is a rigid rod, whose one end is mounted onto the fixed part;
wherein the fixed part is connected to a main frame, and the movable part as well as the other end of the torsion rod are respectively connected to a cover frame, and thus when the cover frame is being closed down, the fixed part is in a fixed condition and the torsion rod and the cover frame rotate together, leading to the torsion rod being in a twisted condition of storing energy; whereas when the cover frame is being opened up, the stored energy of the torsion rod is released to provide an auxiliary force,
wherein the fixed part is a shaft, having an axle extending from one end axially, a connecting segment in the middle of the axle, a linking portion disposed on one end of the fixed part to connect to the main frame, and a connecting portion disposed on the other end of fixed part, wherein the connecting portion is radially machined to have an indented shaft slot to accommodate a snappingly engaged portion disposed on the one end of the torsion rod, which is further securingly retained on the connecting portion with a retaining strip mounted onto a shaft neck extending axially from the shaft slot;
wherein the movable part is a tubular body, having a sleeve, a jointing portion disposed at an appropriate position to be mounted onto the cover frame, at least a wear resistant strip and a frictional strip attached on each side of the jointing portion, and at least an elastic body attached at the external side of the jointing portion, such that when the axle passes through therein, an end cap is provided to connect the wear resistant strip, frictional strip, and elastic body onto the connecting segment.

2. The labor-saving pivotal shaft structure as defined in claim 1, wherein the elastic body is a belleville washer, a wave washer or spring.

3. The labor-saving pivotal shaft structure as defined in claim 1, wherein both sides of the elastic body are disposed with a gasket, respectively.

4. The labor-saving pivotal shaft structure as defined in claim 1, wherein the linking portion includes a fitting tenon and is inserted into a fitting hole of the main frame and is mounted into the fitting hole by a plurality of engrossings on its surface.

5. The labor-saving pivotal shaft structure as defined in claim 1, wherein the snappingly engaged portion on the one end of the torsion rod is mounted in the connecting portion, and the torsion rod includes a retaining portion on the other end which is retained onto a retaining hole of the cover frame.

6. The labor-saving pivotal shaft structure as defined in claim 1, wherein the torsion rod is received in a rod recess predisposed in the cover frame and a plurality of press tenons protruding from one side on the top of the cover frame are used to restrict the torsion rod and to prevent it from coming out of the rod recess.

* * * * *